United States Patent
Gu et al.

(10) Patent No.: US 12,436,774 B2
(45) Date of Patent: Oct. 7, 2025

(54) METHOD, APPARATUS AND COMPUTER-READABLE MEDIUM FOR PROGRAM LOADING

(71) Applicant: Beijing Youzhuju Network Technology Co., Ltd., Beijing (CN)

(72) Inventors: Zhenghao Gu, Beijing (CN); Shijian Ge, Beijing (CN); Xiang Shen, Beijing (CN); Xiaobo Yan, Beijing (CN); Jingjie Zhu, Beijing (CN); Bo Zhang, Beijing (CN); Yongsu Zhang, Beijing (CN); Yu Zhang, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/777,354

(22) Filed: Jul. 18, 2024

(65) Prior Publication Data
US 2024/0370272 A1    Nov. 7, 2024

Related U.S. Application Data

(63) Continuation of application No. PCT/CN2023/070732, filed on Jan. 5, 2023.

(30) Foreign Application Priority Data

Jan. 18, 2022    (CN) .......................... 202210055209.2

(51) Int. Cl.
*G06F 9/4401*    (2018.01)
(52) U.S. Cl.
CPC .................. *G06F 9/4401* (2013.01)

(58) Field of Classification Search
None
See application file for complete search history.

(56) References Cited

U.S. PATENT DOCUMENTS

2005/0015215 A1* 1/2005 Zhang ................... G06F 9/4418
                                                          702/119
2017/0177376 A1   6/2017 Toyoda
                        (Continued)

FOREIGN PATENT DOCUMENTS

CN    108874491 A    11/2018
CN    109783102 A     5/2019
                        (Continued)

OTHER PUBLICATIONS

International Patent Application No. PCT/CN2023/070732; Int'l Search Report; dated Apr. 14, 2023; 2 pages.
(Continued)

*Primary Examiner* — Paul Yen
(74) *Attorney, Agent, or Firm* — BakerHostetler (57) ABSTRACT

The disclosure relates to a method, apparatus, computer-readable medium and electronic device for program loading. The method includes: loading the bin file at a program loading speed that is a first speed, adjusting the program loading speed to a second speed based on the configuration parameter in the bin file, the second speed being faster than the first speed, and then loading a FSBL at the program loading speed that is the second speed. By executing the configuration parameter in the bin file to adjust the speed of the Bootrom loading the FSBL from flash memory, the time for the Bootrom to load FSBL is shortened, and thus embedded systems are enabled to be compatible with various flash memories while also being applicable in occasions sensitive to startup time.

20 Claims, 3 Drawing Sheets

(56) References Cited

U.S. PATENT DOCUMENTS

| | | | |
|---|---|---|---|
| 2017/0220033 A1 | 8/2017 | Hallihole et al. | |
| 2020/0036519 A1* | 1/2020 | Bitauld | H04L 9/0897 |
| 2020/0301715 A1 | 9/2020 | Luong et al. | |
| 2023/0004517 A1* | 1/2023 | Zhao | G06F 13/1673 |

FOREIGN PATENT DOCUMENTS

| | | |
|---|---|---|
| CN | 104679559 B | 6/2019 |
| CN | 109947500 A | 6/2019 |
| JP | 2005258967 A | 9/2005 |
| JP | 2008134736 A | 6/2008 |
| JP | 2018531461 A | 10/2018 |
| WO | WO 2017/022300 A1 | 2/2017 |

OTHER PUBLICATIONS

Anonymous, "Serial Peripheral Interface—Wikipedia," Nov. 22, 2021, retrieved from https://en.wikipedia.org/w/index.php?title=Serial_Peripheral_Interface&oldid=1056587197.

Anonymous, "UEFI—Wikipedia," Jan. 7, 2022, retrieved from https://en.wikipedia.org/w/index.php?title=UEFI&oldid=1064267983#Secure_Boot.

Anonymous, "Physical layer—Wikipedia," Dec. 19, 2021, retrieved from https://en.wikipedia.org/w/index.php?title=Physical_layer&oldid=1061096550.

European Patent Application No. 23742708.3; Extended European Search Report dated Mar. 4, 2025, 12 pages.

Japanese Patent Application No. 2024-543029; Office Action dated Jul. 29, 2025, 14 pages with machine translation.

\* cited by examiner

METHOD, APPARATUS AND COMPUTER-READABLE MEDIUM FOR PROGRAM LOADING

CROSS REFERENCE

This application is a continuation of International Patent Application No. PCT/CN2023/070732, filed on Jan. 5, 2023, which claims priority to Chinese Patent Application No. 202210055209.2, filed on Jan. 18, 2022, and entitled "Method, apparatus and computer-readable medium for program loading", both of which are hereby incorporated herein by reference in their entireties.

FIELD

The present disclosure relates to hardware program loading, and in particular, to a method, apparatus, computer-readable medium and electronic device for program loading.

BACKGROUND

Bootrom or Boot ROM (Read-Only Memory) is a small piece of mask ROM or write-protected flash memory embedded in a CPU chip, which may not be flexibly modified. If a first-stage boot loader (FSBL) of an embedded system (such as various accelerator cards on a server) is in a serial peripheral interface flash (SPI flash memory), the Bootrom needs to load the FSBL into Static Random-Access Memory (SRAM) after the CPU is powered on, verify and execute FSBL. Due to security requirements, even the execute In Place (XIP) way needs to read the entire FSBL and verify it before jumping to execution.

In order for embedded systems to be compatible with various SPI Nor flash (non-volatile flash memory), the clock rate of the SPI controller in the Bootrom is relatively low (usually about 10 MHz), resulting in a long time to load FSBL, which may not be applied to occasions that are sensitive to startup time.

SUMMARY

This summary section is provided to introduce in brief form the ideas that are described in detail in the detailed description section that follows. This summary section is not intended to identify key features or essential features of the claimed technical solution, nor is it intended to be used to limit the scope of the claimed technical solution.

In a first aspect, the present disclosure provides a method for program, the method being implemented at an electronic device. The method includes: loading the bin file at a program loading speed that is a first speed; the bin file comprising a configuration parameter for adjusting the program loading speed; adjusting the program loading speed to a second speed based on the configuration parameter in the bin file, the second speed being faster than the first speed; and loading a first-stage bootloader, FSBL, at the program loading speed which is adjusted to the second speed.

In a second aspect, the present disclosure provides an apparatus program loading, the apparatus being implemented at an electronic device. The apparatus includes: a loading module configured to load the bin file at a program loading speed that is a first speed; the bin file comprising a configuration parameter for adjusting the program loading speed; a processing module configured to adjust the program loading speed to a second speed based on the configuration parameter in the bin file; the second speed being faster than the first speed; and the loading module being further configured to load a first-stage bootloader, FSBL, at the program loading speed which is adjusted to the second speed.

In a third aspect, the present disclosure provides a computer-readable medium having a computer program stored thereon that, when executed by a processing device, implements the steps of the aforementioned method.

In a fourth aspect, the present disclosure provides an electronic device, comprising: a storage device having a computer program stored thereon; and a processing device configured to execute the computer program in the storage device to implement the steps of the aforementioned method.

Through the above technical solution, the bin file in the flash memory is loaded at the program loading speed that is the first speed, and the program loading speed is adjusted to the second speed based on the configuration parameter in the bin file. The second speed is faster than the first speed, and then the FBSL is loaded at the second speed. By executing the configuration parameter in the bin file to adjust the speed of the Bootrom loading the FSBL from flash memory, the time for the Bootrom to load FSBL is shortened, and thus embedded systems are enabled to be compatible with various flash memories while also being applicable in occasions sensitive to startup time.

Other features and advantages of the present disclosure will be detailed in the detailed description section that follows.

BRIEF DESCRIPTION OF THE DRAWINGS

The above and other features, advantages and aspects of various embodiments of the present disclosure will become more apparent with reference to the following detailed description in conjunction with the accompanying drawings. Throughout the drawings, the same or similar reference numbers refer to the same or similar elements. It is to be understood that the drawings are schematic, and components and elements are not necessarily drawn to scale. In the drawings.

EXPLANATION OF REFERENCE SIGNS

100—electronic device; 10—Boot ROM: 20—SPI flash memory; 20—apparatus for program loading; 201—loading module; 203—processing module; 600—computer device; 601—processing device; 602—ROM; 603—RAM; 604—bus; 605—I/O interface; 606—input device; 607—output device; 608—storage device; 609—communication device.

DETAILED DESCRIPTION

Embodiments of the present disclosure will be described in more detail below with reference to the accompanying drawings. Although certain embodiments of the disclosure are shown in the drawings, it should be understood that the disclosure may be embodied in various forms and should not be construed as limited to the embodiments set forth herein, but rather these embodiments are provided for thoroughness and clarity to fully understand the present disclosure. It should be understood that the drawings and embodiments of the present disclosure are for illustrative purposes only and are not intended to limit the scope of the present disclosure.

It should be understood that various steps described in the method implementations of the present disclosure may be performed in different orders and/or in parallel. Furthermore, method embodiments may include additional steps and/or omit performance of illustrated steps. The scope of the present disclosure is not limited in this regard.

As used herein, the term "include" and its variations are open-ended, i.e., "include but not limited to." The term "based on" means "based at least in part on." Relevant definitions of other terms will be given in the description below.

It should be noted that concepts such as "first" and "second" mentioned in the present disclosure are only used to distinguish different devices, modules or units, and are not used to limit the order of functions performed by these devices, modules or units, or the interdependence.

It should be noted that the modifications of "a" and "a plurality of" mentioned in the present disclosure are illustrative and not restrictive. Those skilled in the art may understand that unless the context clearly indicates otherwise, it should be understood as "one or a plurality of".

The names of messages or information exchanged between multiple devices in the embodiments of the present disclosure are for illustrative purposes only and are not used to limit the scope of these messages or information.

Boot ROM (Bootrom) is the code solidified in the internal ROM of a CPU. The Bootrom contains the first code executed by the processor when it is powered on or reset. Depending on the configuration of certain strap pins or internal fuses, it may decide where to load the next part of the code to be executed as well as verify that the code to be executed is correct or valid. Sometimes, the Bootrom may also contain additional functions that may be used by user code during or after boot. For example, for iPhone boot ROM, the code embedded in the mask ROM cannot be modified, the ROM loads the next-level bootloader from flash memory (flash) or USB and uses the built-in RSA algorithm to verify the signature of the bootloader, and the ROM provides the accelerated decryption function for the next-level bootloader.

SPI flash is a flash storage device that operates through the serial peripheral interface (SPI). Flash is usually divided into two types according to different internal storage structures: Nor flash and Nand flash. Here, the SPI flash belongs to Nor flash. SPI flash reads and writes slowly, and the number of reads and writes is also limited. It is generally used for storage that does not change frequently. The interface of early stage Nor flash is in the form of parallel, that is, the data lines and address lines are connected side by side to the pins of the integrated circuit (IC). But later, people in the industry discover that Nor flash with different capacities is not compatible in hardware because the number of data lines and address lines is different, and the package is relatively large, occupying a larger area of a printed circuit board (PCB), and thus it is gradually replaced by SPI Nor flash later. At the same time. SPI Nor flash pins with different capacities are also compatible with smaller packages, so that nowadays, many professionals in the industry directly refer to SPI flash as Nor flash.

The XIP way means that the application may be run directly in flash without having to read the code into the system Random Access Memory (RAM). Execution in flash means that Nor flash docs not need to be initialized and the code may be executed directly in flash. However, often only part of the code is executed, such as initializing RAM.

If the FSBL of the embedded system is in SPI flash, the Bootrom needs to load the FSBL to SRAM after the CPU is powered on. In addition, after loading to SRAM, due to security requirements, the signature of the FSBL needs to be verified and then the FSBL is executed. Even the XIP way requires reading the entire FSBL and verifying the signature before executing the FSBL.

For a SPI controller that support high-speed clock (CLK) (high-speed here usually refers to a clock frequency greater than 25 MHz, that is, CLK>25 MHz), it usually has a port physical layer (PHY). The PHY register needs to be adapted according to the wiring of the circuit board, flash parameters, etc. to work. However, the Bootrom is solidified inside the CPU chip and cannot flexibly customize the values of these PHY registers. Even though some high-speed SPI controllers may modify the value of the PHY register through jumpers, this jumper way may not cover all related PHY registers. Therefore, when the Bootrom reads the FSBL, the clock rate of the SPI controller cannot be set too high, such as usually not higher than 25 MHz.

SPI is divided into three modes which are Single SPI (standard SPI, transmitting 1 bit in one clock), Dual SPI (double SPI, transmitting 2 bits in one clock) and Quad SPI (quadruple SPI, transmitting 4 bits in one clock), corresponding to 3-wire, 4-wire and 6-wire respectively. Under the same clock, the more the number of wires, the higher the data transmission rate. Most SPI flash support QSPI (Quad SPI), but the CPU needs to read the serial flash discoverable parameter (flash SFDP) to determine how to enable QSPI. However, these logics are cumbersome and complicated and not suitable for putting into the Bootrom.

Therefore, in order to be compatible with various SPI Nor flash for embedded systems, the clock rate of the SPI controller in the Bootrom is relatively conservative (about 10 MHz), and the QSPI mode of SPI is rarely turned on, resulting in too long loading time of the FSBL.

The above reasons largely limit the application of SPI flash in situations that are sensitive to startup time. For example, for the peripheral component interconnect express (PCIe) card, the PCIe specification requires that the time from system power-on to PCIe initialization must be completed within 120 ms. Assuming that the size of FSBL is 50 KB and a 10 MHz SPI clock is used, the loading rate of the FSBL is: $50K \times 8/10$ MHz=40 ms. If only loading FSBL takes 40 ms, it places too high requirements on the speed of hardware and software initialization before PCIe is powered on.

Based on the above reasons, the existing method of loading the FSBL is not suitable for occasions that are sensitive to startup time. Therefore, in order to solve this issue, the present disclosure proposes a method for program loading of the Bootrom that may be applied to embedded systems. This method shortens the time for the Bootrom to load FSBL from SPI flash. The following will provide a detailed explanation of this method.

Figure 1:
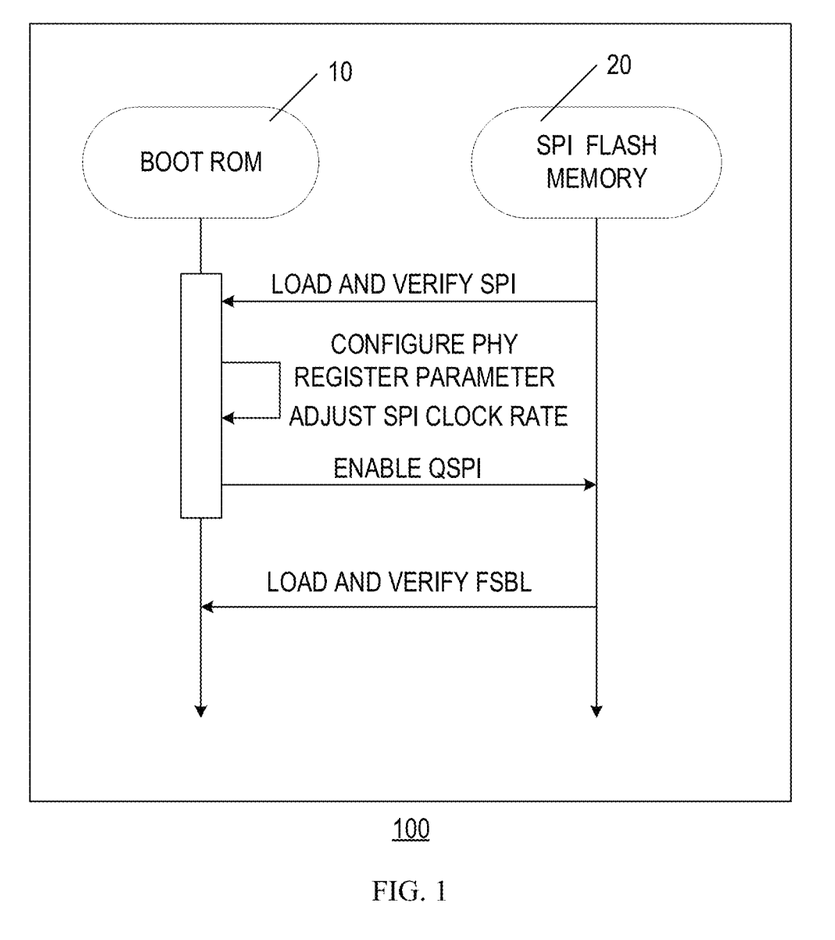
FIG. 1 is a schematic structural diagram of an electronic device provided by an example embodiment of the present disclosure.

FIG. 1 shows a schematic structural diagram of an electronic device provided by an example embodiment of the present disclosure.

The electronic device 100 includes a boot ROM (Bootrom) 10 and a SPI flash memory (SPI flash) 20. The SPI flash memory 20 may be a SPI Nor flash.

A bin file may be stored in the SPI flash memory 20.

After the CPU of the electronic device is powered on, the Bootrom establishes a communication connection with the SPI flash memory 20. Firstly, the Bootrom verifies the security of the SPI flash memory 20, and after the SPI flash memory 20 passes the security verification, the Bootrom reads the relevant code in the SPI flash memory 20 and executes it, to obtain relevant parameters to adapt the PHY register, or adjust the clock rate of the SPI controller. Then, the FSBL is read from the SPI flash memory 20 and security verification perform. After the FSBL passes the security verification, the Bootrom executes the FSBL.

Figure 2:
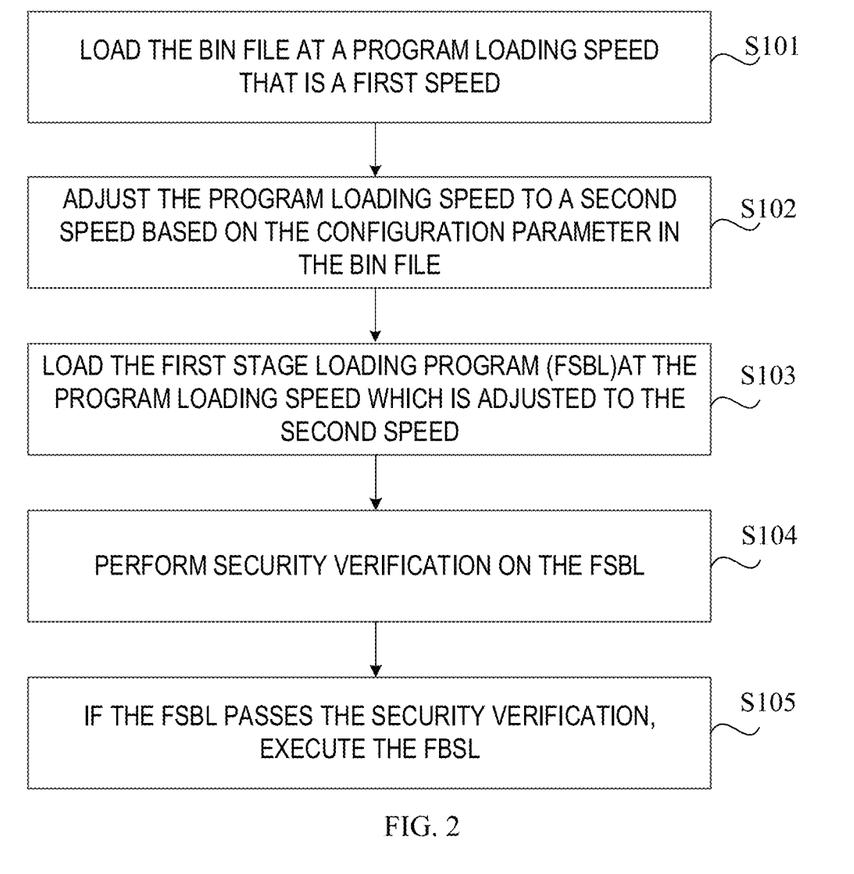
FIG. 2 is a flowchart of the method for program loading provided by an example embodiment of the present disclosure.

Refer to FIG. 2, which is a flowchart of a method for program loading provided by an example embodiment of the present disclosure. The method may include the following steps.

At step S101, the bin file is loaded at a program loading speed that is a first speed.

Because the embedded system is compatible with various SPI nor flash, the clock rate of the SPI controller in the Bootrom is relatively low, which is about 10 MHz. Therefore, the first speed in this step is a reasonable value in this field. This value may be obtained based on human experience or other feasible ways. For example, the first speed may be but not limited to the clock rate value of the SPI controller which is 10 MHz.

It should be noted that the bin file is stored in the SPI flash. The bin file contains a configuration parameter for adjusting the program loading speed. The configuration parameter includes at least one of the following: a PHY register configuration parameter, a flash memory adaptation parameter, and a SPI clock rate parameter. The PHY register configuration parameter is used to adjust the PHY register configuration of the board-level wiring of the embedded system, specifically to adjust the phase relationship between the SPI signals, so that the SPI may work normally. The SPI clock rate parameter is used to adjust the clock rate of the SPI controller, and the flash memory adaptation parameter is used to enable the QSPI mode of the SPI.

At step S102, the program loading speed is adjusted to a second speed based on the configuration parameter in the bin file.

In an example, the PHY register configuration of the board-level wiring of the embedded system is adjusted based on the PHY register configuration parameter in the bin file, specifically to adjust the phase relationship between the SPI signals, so that the SPI may work normally.

It should be noted that the value of the second speed is greater than the first speed. The second speed is a reasonable value in this field. This value may be obtained based on human experience or other feasible ways. For example, the second speed may be but not limited to the clock rate of the SPI controller which is 50 MHz.

Figure 3:
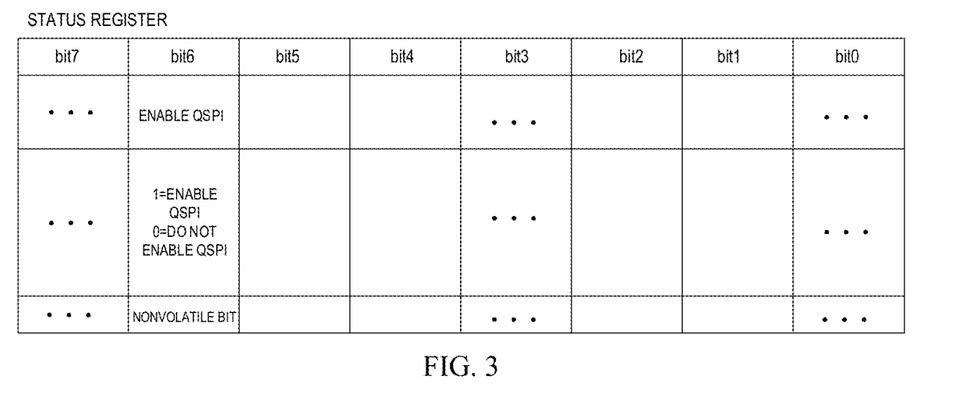
FIG. 3 is a diagram of parameter configuration of a status register provided by an example embodiment of the present disclosure.

The way of adjusting the program loading speed to the second speed based on the configuration parameter in the bin file may be enabling a QSPI mode of a SPI based on the flash memory adaptation parameter, to cause the program loading speed to reach the second speed. As mentioned above, SPI may be divided into the above three modes: Single SPI, Dual SPI and Quad SPI, which correspond to 3-wire, 4-wire and 6-wire respectively. Under the same clock, the more the number of wires, the higher the data transmission rate. Flashes manufactured by different companies correspond to different adjustment ways. The specific adjustment ways may be obtained based on the flash manual given by the company, which is not limited in this disclosure. For example, the flash of a certain company is taken as an example to illustrate, as shown in FIG. 3, which shows a diagram of parameter configuration of a status register. Bit0-bit7 are all registers, where Quad Enable (QE) is usually controlled by the bit6 register, that is, the QSPI mode is controlled by the bit6 register. The value of this bit is 0 or 1, which is used to indicate whether to enable QSPI or not (i.e., 1=Quad Enable, 0=not Quad Enable), and thus by adjusting the bit6 register parameter of the status register, the QSPI mode of SPI can be enabled.

Alternatively, the way of adjusting the program loading speed to the second speed based on the configuration parameter in the bin file may further be adjusting a clock rate of the SPI based on the SPI clock rate parameter in the bin file, to cause the program loading speed to reach the second speed. In an optional implementation, the clock rate of the SPI controller may be adjusted to 50 MHz.

Alternatively, the way of adjusting the program loading speed to the second speed based on the configuration parameter in the bin file may further be enabling the QSPI mode of the SPI based on the flash memory adaptation parameter in the bin file and adjusting the clock rate of the SPI based on the SPI clock rate parameter in the bin file, to cause the program loading speed to reach the second speed. The clock rate of the controller is adjusted to allow the program loading speed to reach the second speed. In an optional implementation, the clock rate of the SPI controller may be adjusted to 50 MHz.

At step S103, the first stage loading program (FSBL) is loaded at the program loading speed which is adjusted to the second speed.

The Bootrom reads FSBL from SPI flash at the second speed program loading speed. Normally, the second speed can be adjusted to 4-5 times the first speed, thereby achieving the purpose of loading FSBL at a high speed.

In an example, for the PCIe card mentioned above, the PCIe specification requires that the time from system power on to PCIe initialization completion must be within 120 ms. Assuming that the FSBL is 50 KB, if the SPI clock rate that is the first speed (such as 10 MHz) is used, loading the FSBL requires 50K×8/10 MHz=40 ms. If the method for program loading proposed in the present disclosure is used, the bin file may be loaded at the first speed first, assuming the size of the bin file is 500 bytes, and then the QSPI mode of SPI is enabled to adjust the program loading speed to the second speed (such as 50 MHz), then loading FSBL requires 500× 8/10 MHz+50K×8/(4×50 MHz)=0.4 ms+2 ms=2.4 ms, which saves about 90% of the FSBL loading time.

Through the above method, the configuration parameter in the bin file is executed to adjust the speed of the Bootrom loading the FSBL from the flash memory, which shortens the time for the Bootrom to load the FSBL and thus embedded systems are enabled to be compatible with various flash memories while also being applicable in occasions sensitive to startup time. Products that are forced to use SD/MMC related registers may use SPI flash instead due to Bootrom startup speed limitations, thereby reducing hardware costs.

Further, the above method may further include the following steps.

At step S104, security verification is performed on the FSBL.

It should be noted that a variety of feasible encryption algorithms may be used to perform security verification on the FSBL which is not limit in the present disclosure.

In an example, the security verification on the FSBL using the MD5 algorithm is used as an example for explanation. Normally, the FSBL and a first encrypted signature of the FSBL are packaged together and stored in the SPI flash. The first encrypted signature is obtained by encrypting the signature of FSBL with a private key. The FSBL and the first encrypted signature of the FSBL are obtained from the FSBL loaded at step S103, and then the first encrypted signature is decrypted by a public key pre-stored in Bootrom corresponding to the private key, to obtain the decrypted first signature. The signature of FSBL is calculated to obtain the second signature of FSBL and the first signature is compared with the second signature. When the first signature is the same as the second signature, it is determined that the FSBL passes the security verification.

At step S105, if the FSBL passes the security verification, the FSBL is executed.

In addition, it should be noted that the specific implementation of the method for program loading provided by the present disclosure may be to add a plug-in in the Bootrom. The plug-in is not only limited to high-speed loading of the FSBL, but may also achieve other purposes by adjusting the code in the plug-in. For example, some flashes may only access the first 16 M address space without special configuration. After configuring the corresponding access address space plug-in, it may be expanded to the 4 G address space.

To sum up, the method for program loading provided by the present disclosure includes: loading the bin file in the SPI flash at a program loading speed that is a first speed, adjusting the program loading speed to a second speed based on a configuration parameter in the bin file, the second speed being faster than the first speed and loading a FSBL at the program loading speed that is a second speed. By executing the configuration parameter in the bin file, the speed of the Bootrom loading the FSBL from SPI flash is adjusted, which shortens the time for the Bootrom to load FSBL, and thus embedded systems are enabled to be compatible with various flash memories while also being applicable in occasions sensitive to startup time.

Figure 4:
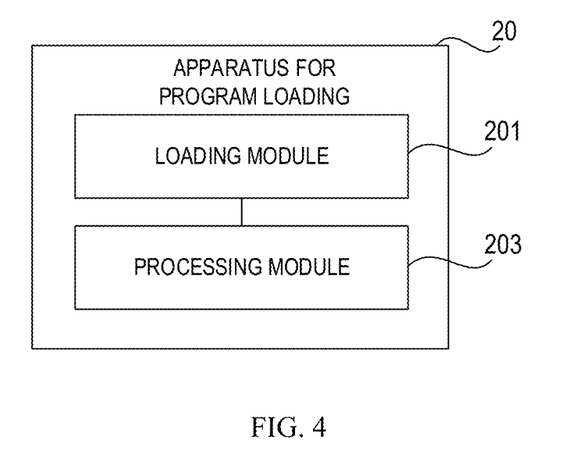
FIG. 4 is a block diagram of an apparatus for program loading provided by an example embodiment of the present disclosure.

FIG. 4 is a block diagram of an apparatus program loading provided by an example embodiment of the present disclosure. Referring to FIG. 4, the apparatus 20 includes a loading module 201 and a processing module 203.

The loading module 201 is configured to load the bin file at a program loading speed that is a first speed; the bin file comprising a configuration parameter for adjusting the program loading speed.

The processing module 203 is configured to adjust the program loading speed to a second speed based on the configuration parameter in the bin file; the second speed being faster than the first speed.

The loading module 201 is further configured to load a first-stage bootloader, FSBL, at the program loading speed which is adjusted to the second speed.

Optionally, the configuration parameter comprises at least one of the following: a port physical layer, PHY, register configuration parameter, a flash memory adaptation parameter, or a serial peripheral interface, SPI, clock rate parameter.

Optionally, the processing module 203 is configured to:
obtain a PHY register configuration parameter, a flash memory adaptation parameter and a SPI clock rate parameters in the bin file;
adjust a board-level wiring PHY register configuration in the flash memory based on the PHY register configuration parameter; and enable a QSPI mode of a SPI based on the flash memory adaptation parameter, to cause the program loading speed to reach the second speed, or, adjust a clock rate of the SPI in the flash memory based on the SPI clock rate parameter, to cause the program loading speed to reach the second speed, or, enable the QSPI mode of the SPI based on the flash memory adaptation parameter and adjust the clock rate of the SPI in the flash memory based on the SPI clock rate parameter, to cause the program loading speed to reach the second speed.

Optionally; the processing module 203 is further configured to:
performing a security verification on the FSBL; and
in response to the FSBL passing the security verification, executing the FSBL.

Optionally; the processing module 203 is configured to:
obtaining a first encrypted signature of the FSBL from the loaded FSBL;
decrypting the first encrypted signature by a pre-stored public key, to obtain a decrypted first signature;
calculating a signature of the FSBL to obtain a second signature of the FSBL;
comparing the first signature with the second signature; and
if the first signature is the same as the second signature, determining that the FSBL passes the security verification.

Figure 5:
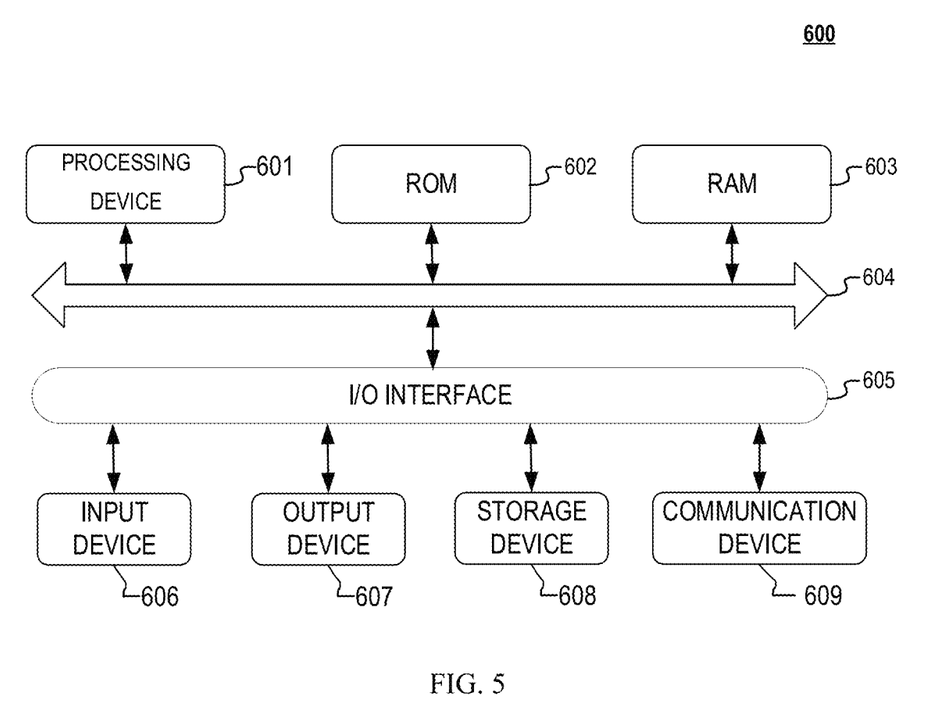
FIG. 5 is a schematic structural diagram of an electronic device provided by an example embodiment of the present disclosure.

Reference is now made to FIG. 5, which shows a structural schematic diagram of an electronic device 600 adapted to implement the embodiments of the present disclosure. The terminal device according to the embodiment of the present disclosure may include, but not limited to, mobile terminals such as a mobile phone, a laptop computer, a digital broadcast receiver, a Personal Digital Assistant (PDA), a tablet computer or PAD, a Portable Multimedia Player (PMP), and an in-vehicle terminal (e.g., an in-vehicle navigation terminal), and fixed terminals such as a digital TV and a desktop computer. The electronic device illustrated in FIG. 5 is merely an example and should not be construed as limiting the function and scope of use of the embodiments of the present disclosure.

As illustrated in FIG. 5, the electronic device 600 may include a processing device 601 (e.g., a central processor, a graphics processor, etc.), which may perform various appropriate actions and processing in accordance with programs stored in a read only memory (ROM) 602 or loaded from a storage device 608 into a random access memory (RAM) 603. Various programs and data required for operation of the electronic device 600 may also be stored in the RAM 603. The processing device 601, the ROM 602, and the RAM 603 are connected to each other through a bus 604. An input/output (I/O) interface 605 is also connected to bus 604.

Generally, the following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a liquid crystal display (LCD), a speaker, a vibrator, and the like; a storage device 608 including, for example, magnetic tape, hard disk, etc.; and a communication device 609. The communication device 609 may allow the electronic device 600 to perform wireless or wired communication with other devices for data exchange. Although FIG. 5 illustrates the electronic device 600 having various devices, it should be understood that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a non-transient computer-readable medium. The computer program includes program codes for implementing the method illustrated in any of the flowcharts. In these embodiments, the computer program may be downloaded and installed from a network through the communication device 609, or installed from the storage device 608, or installed from the ROM 602. The computer program, when executed by the processing device 601, implements the above-mentioned functions defined in the method according to the embodiments of the present disclosure.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a random access memory (RAM), a read only memory (ROM), an erasable programmable read only memory (EPROM) or a flash memory, an optical fiber, a compact disc read-only memory (CD-ROM), an optical storage device, a magnetic storage device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

The above-mentioned computer readable medium may be contained in the above-mentioned electronic device or may be standalone without being assembled into the electronic device.

The above-mentioned computer-readable medium carries one or more programs. When the one or more programs are executed by the electronic device, cause the electronic device to: loading the bin file at a program loading speed that is a first speed; the bin file comprising a configuration parameter for adjusting the program loading speed; adjusting the program loading speed to a second speed based on the configuration parameter in the bin file; the second speed being faster than the first speed; and loading a first-stage bootloader, FSBL, at the program loading speed which is adjusted to the second speed.

The computer program codes for implementing the operations of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, the functions showed in blocks may occur in an order other than the order illustrated in the drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented using a dedicated hardware-based system configured to perform specified functions or operations or may be implemented using a combination of dedicated hardware and computer instructions.

The modules involved in the embodiments described in this disclosure may be implemented in software or hardware. The name of the module does not constitute a limitation on the module itself under certain circumstances.

The functions described herein above may be performed, at least in part, by one or more hardware logic components. For example, without limitation, exemplary types of suitable hardware logic components include a field programmable gate array (FPGA), an application specific integrated circuit (ASIC), an application specific standard product (ASSP), a system on chip (SOC), a complex programmable logic device (CPLD), and the like.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection having one or more wires, a portable computer disk, a hard disk, a random access memory (RAM), a read only memory (ROM), an erasable programmable read only memory (EPROM) or flash memory; an optical fiber, a compact disc read only memory (CD-ROM), an optical storage device, a magnetic storage device, or any suitable combination thereof.

According to one or more embodiments of the present disclosure, example 1 provides a method for program loading, the method being implemented at an electronic device. A preconfigured bin file is stored in a flash memory of the electronic device. The method includes: loading the bin file at a program loading speed that is a first speed; the bin file comprising a configuration parameter for adjusting the program loading speed;
   adjusting the program loading speed to a second speed based on the configuration parameter in the bin file; the second speed being faster than the first speed; and
   loading a first-stage bootloader, FSBL, at the program loading speed which is adjusted to the second speed.

According to one or more embodiments of the present disclosure, example 2 provides the method of example 1, the configuration parameter comprises at least one of the following: a port physical layer, PHY, register configuration parameter, a flash memory adaptation parameter, or a serial peripheral interface, SPI, clock rate parameter.

According to one or more embodiments of the present disclosure, example 3 provides the method of example 1, and the step of adjusting the program loading speed to a second speed based on the configuration parameter in the bin file comprises:
   obtaining a PHY register configuration parameter, a flash memory adaptation parameter and a SPI clock rate parameters in the bin file;
   adjusting a board-level wiring PHY register configuration in the flash memory based on the PHY register configuration parameter; and
   enabling a QSPI mode of a SPI based on the flash memory adaptation parameter, to cause the program loading speed to reach the second speed,
   or, adjusting a clock rate of the SPI in the flash memory based on the SPI clock rate parameter, to cause the program loading speed to reach the second speed.
   or, enabling the QSPI mode of the SPI based on the flash memory adaptation parameter and adjusting the clock rate of the SPI in the flash memory based on the SPI clock rate parameter, to cause the program loading speed to reach the second speed.

According to one or more embodiments of the present disclosure, example 4 provides the method of example 3. After the step of loading a FSBL at the program loading speed which is adjusted to the second speed, the method further comprises:
   performing a security verification on the FSBL; and
   in response to the FSBL passing the security verification, executing the FSBL.

According to one or more embodiments of the present disclosure, example 5 provides the method of example 4, and the step of performing a security verification on the FSBL comprises:
   obtaining a first encrypted signature of the FSBL from the loaded FSBL;
   decrypting the first encrypted signature by a pre-stored public key; to obtain a decrypted first signature;
   calculating a signature of the FSBL to obtain a second signature of the FSBL;
   comparing the first signature with the second signature; and
   if the first signature is the same as the second signature, determining that the FSBL passes the security verification.

According to one or more embodiments of the present disclosure, example 6 provides the method of example 1, and the flash memory of the electronic device is a SPI flash memory.

According to one or more embodiments of the present disclosure, example 7 provides an apparatus for program loading, the apparatus being implemented at an electronic device. A preconfigured bin file is stored in a flash memory of the electronic device. The apparatus includes:
   a loading module configured to load the bin file at a program loading speed that is a first speed; the bin file comprising a configuration parameter for adjusting the program loading speed;
   a processing module configured to adjust the program loading speed to a second speed based on the configuration parameter in the bin file; the second speed being faster than the first speed; and
   the loading module being further configured to load a first-stage bootloader, FSBL, at the program loading speed which is adjusted to the second speed.

According to one or more embodiments of the present disclosure, example 8 provides the apparatus of example 7, the processing module is configured to:
   obtain a PHY register configuration parameter, a flash memory adaptation parameter and a SPI clock rate parameters in the bin file;
   adjust a board-level wiring PHY register configuration in the flash memory based on the PHY register configuration parameter; and
   enable a QSPI mode of a SPI based on the flash memory adaptation parameter, to cause the program loading speed to reach the second speed,
   or, adjust a clock rate of the SPI in the flash memory based on the SPI clock rate parameter, to cause the program loading speed to reach the second speed,
   or, enable the QSPI mode of the SPI based on the flash memory adaptation parameter and adjust the clock rate of the SPI in the flash memory based on the SPI clock rate parameter, to cause the program loading speed to reach the second speed.

According to one or more embodiments of the present disclosure, example 9 provides a computer-readable medium having a computer program stored thereon that, when executed by a processing device, implements the steps of the aforementioned method for program loading.

According to one or more embodiments of the present disclosure, example 10 provides an electronic device, including:
   a storage device having a computer program stored thereon; and
   a processing device configured to execute the computer program in the storage device to implement the steps of the aforementioned method for program loading.

The above description is only intended to explain the preferred embodiments of the present disclosure and the employed principles of the technology. It will be appreciated by those skilled in the art that the scope of the present disclosure herein is not limited to the technical solutions formed by the specific combination of the above technical features but should also encompass any other combinations of features described above or equivalents thereof without departing from the above idea of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. On the contrary, various features described in the context of a single embodiment can also be implemented in multiple embodiments separately or in any suitable combination.

Although the subject matter has been described in language specific to structural features and/or logical actions of the method, it should be understood that the subject matter defined in the appended claims is not necessarily limited to the specific features or actions described above. On the contrary, the specific features and actions described above are merely example forms of implementing the claims.

We claim:

1. A method for program loading, the method being implemented at an electronic device, wherein a preconfigured bin file is stored in a flash memory of the electronic device, the method comprising:
   loading the bin file at a program loading speed that is a first speed, the bin file comprising a configuration parameter for adjusting the program loading speed;
   adjusting the program loading speed to a second speed based on the configuration parameter in the bin file; the second speed being faster than the first speed;
   loading a first-stage bootloader (FSBL) at the program loading speed which is adjusted to the second speed;
   wherein the adjusting the program loading speed to a second speed based on the configuration parameter in the bin file comprises:
   obtaining a port physical layer (PHY) register configuration parameter, a flash memory adaptation parameter, and a serial peripheral interface (SPI) clock rate parameter in the bin file;
   adjusting a board-level wiring PHY register configuration in the flash memory based on the PHY register configuration parameter; and
   enabling a quad SPI (QSPI) mode of an SPI based on the flash memory adaptation parameter to cause the program loading speed to reach the second speed, or adjusting a clock rate of the SPI in the flash memory based on the SPI clock rate parameter to cause the program loading speed to reach the second speed, or enabling the QSPI mode of the SPI based on the flash memory adaptation parameter and adjusting the clock rate of the SPI in the flash memory based on the SPI clock rate parameter, to cause the program loading speed to reach the second speed.

2. The method of claim 1, wherein the configuration parameter comprises the PHY register configuration parameter, the flash memory adaptation parameter, and the SPI clock rate parameter.

3. The method of claim 1, wherein the method further comprises: after loading an FSBL at the program loading speed which is adjusted to the second speed, performing a security verification on the FSBL; and
   in response to the FSBL passing the security verification, executing the FSBL.

4. The method of claim 3, wherein performing a security verification on the FSBL comprises:
   obtaining a first encrypted signature of the FSBL from the loaded FSBL;
   decrypting the first encrypted signature by a pre-stored public key, to obtain a decrypted first signature;
   calculating a signature of the FSBL to obtain a second signature of the FSBL;
   comparing the first signature with the second signature; and
   based on the first signature being the same as the second signature, determining that the FSBL passes the security verification.

5. The method of claim 1, wherein the flash memory of the electronic device is an SPI flash memory.

6. The method of claim 2, wherein the PHY register configuration parameter is used to adjust the PHY register configuration of the board-level wiring of the embedded system, the SPI clock rate parameter is used to adjust a clock rate of an SPI controller, and the flash memory adaptation parameter is used to enable a QSPI mode of the SPI.

7. The method of claim 4, wherein the first encrypted signature is obtained by encrypting a signature of the FSBL with a private key.

8. The method of claim 7, wherein the pre-stored public key corresponds to the private key.

9. The method of claim 1, wherein the first speed is 10 MHz and the second speed is 50 MHz.

10. An electronic device, comprising:
    a storage device having a computer program stored thereon; and
    a processing device configured to execute the computer program in the storage device to perform operations comprising:
    loading a bin file at a program loading speed that is a first speed, the bin file comprising a configuration parameter for adjusting the program loading speed;
    adjusting the program loading speed to a second speed based on the configuration parameter in the bin file; the second speed being faster than the first speed;
    loading a first-stage bootloader (FSBL) at the program loading speed which is adjusted to the second speed;
    wherein the adjusting the program loading speed to a second speed based on the configuration parameter in the bin file comprises:
    obtaining a port physical layer (PHY) register configuration parameter, a flash memory adaptation parameter, and a serial peripheral interface (SPI) clock rate parameter in the bin file;
    adjusting a board-level wiring PHY register configuration in the flash memory based on the PHY register configuration parameter; and
    enabling a quad SPI (QSPI) mode of an SPI based on the flash memory adaptation parameter to cause the program loading speed to reach the second speed, or adjusting a clock rate of the SPI in the flash memory based on the SPI clock rate parameter to cause the program loading speed to reach the second speed, or enabling the QSPI mode of the SPI based on the flash memory adaptation parameter and adjusting the clock rate of the SPI in the flash memory based on the SPI clock rate parameter, to cause the program loading speed to reach the second speed.

11. The electronic device of claim 10, wherein the configuration parameter comprises the PHY register configuration parameter, the flash memory adaptation parameter, and the SPI clock rate parameter.

12. The electronic device of claim 10, wherein the operations method further comprise: after loading an FSBL at the program loading speed which is adjusted to the second speed, performing a security verification on the FSBL; and in response to the FSBL passing the security verification, executing the FSBL.

13. The electronic device of claim 12, wherein the performing a security verification on the FSBL comprises:
   obtaining a first encrypted signature of the FSBL from the loaded FSBL;
   decrypting the first encrypted signature by a pre-stored public key, to obtain a decrypted first signature;
   calculating a signature of the FSBL to obtain a second signature of the FSBL;
   comparing the first signature with the second signature; and
   determining that the FSBL passes the security verification in response to determining that the first signature is the same as the second signature.

14. The electronic device of claim 10, wherein the flash memory of the electronic device is an SPI flash memory.

15. The electronic device of claim 11, wherein the PHY register configuration parameter is used to adjust the PHY register configuration of the board-level wiring of the embedded system, the SPI clock rate parameter is used to adjust a clock rate of a SPI controller and the flash memory adaptation parameter is used to enable a QSPI mode of the SPI.

16. The electronic device of claim 13, wherein the first encrypted signature is obtained by encrypting a signature of the FSBL with a private key.

17. The electronic device of claim 16, wherein the pre-stored public key corresponds to the private key.

18. A non-transitory computer-readable medium having a computer program stored thereon that, when executed by a processing device, performs operations comprising:
   loading a bin file at a program loading speed that is a first speed, the bin file comprising a configuration parameter for adjusting the program loading speed; adjusting the program loading speed to a second speed based on the configuration parameter in the bin file; the second speed being faster than the first speed;
   loading a first-stage bootloader (FSBL) at the program loading speed which is adjusted to the second speed;
   wherein the adjusting the program loading speed to a second speed based on the configuration parameter in the bin file comprises:
   obtaining a port physical layer (PHY) register configuration parameter, a flash memory adaptation parameter, and a serial peripheral interface (SPI) clock rate parameter in the bin file;
   adjusting a board-level wiring PHY register configuration in the flash memory based on the PHY register configuration parameter; and
   enabling a quad SPI (QSPI) mode of an SPI based on the flash memory adaptation parameter to cause the program loading speed to reach the second speed, or adjusting a clock rate of the SPI in the flash memory based on the SPI clock rate parameter to cause the program loading speed to reach the second speed, or enabling the QSPI mode of the SPI based on the flash memory adaptation parameter and adjusting the clock rate of the SPI in the flash memory based on the SPI clock rate parameter, to cause the program loading speed to reach the second speed.

19. The non-transitory computer-readable medium of claim 18, wherein after loading an FSBL at the program loading speed which is adjusted to the second speed, the operations further comprise: performing a security verification on the FSBL; and in response to the FSBL passing the security verification, executing the FSBL.

20. The non-transitory computer-readable medium of claim 19, wherein the performing a security verification on the FSBL comprises:
   obtaining a first encrypted signature of the FSBL from the loaded FSBL;
   decrypting the first encrypted signature by a pre-stored public key, to obtain a decrypted first signature;
   calculating a signature of the FSBL to obtain a second signature of the FSBL;
   comparing the first signature with the second signature; and
   determining that the FSBL passes the security verification in response to determining that the first signature is the same as the second signature.

* * * * *